US011579471B2

(12) United States Patent
Ma et al.

(10) Patent No.: US 11,579,471 B2
(45) Date of Patent: Feb. 14, 2023

(54) SMART GLASSES INCLUDING OBJECT DISTANCE ADJUSTMENT DRIVING GEAR

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhanshan Ma, Beijing (CN); Yuhong Liu, Beijing (CN); Jinbao Peng, Beijing (CN); Bingxin Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/356,367

(22) Filed: Jun. 23, 2021

(65) Prior Publication Data

US 2021/0405396 A1    Dec. 30, 2021

(30) Foreign Application Priority Data

Jun. 30, 2020   (CN) .......................... 202010620267.6

(51) Int. Cl.
*G02B 27/01*        (2006.01)
*G02C 11/00*        (2006.01)
(Continued)

(52) U.S. Cl.
CPC .......... *G02C 11/10* (2013.01); *G02B 27/0176* (2013.01); *G02C 9/02* (2013.01);
(Continued)

(58) Field of Classification Search
CPC ...... G02B 2027/01; G02B 7/09; G02B 7/105; G02B 15/22
See application file for complete search history.

(56) References Cited

U.S. PATENT DOCUMENTS

2010/0188744 A1*  7/2010  Hengst .................. G02B 23/18
                                                        359/413
2015/0138645 A1*  5/2015  Yoo ..................... G02B 27/0101
                                                        359/630
(Continued)

*Primary Examiner* — William Boddie
*Assistant Examiner* — Andrew B Schnirel
(74) *Attorney, Agent, or Firm* — McCoy Russell LLP

(57) ABSTRACT

Smart glasses are provided in the present disclosure, including a housing, a fixing bracket, a left lens barrel, a right lens barrel, an object distance adjustment mechanism including a left-eye object distance adjustment gear, a right-eye object distance adjustment gear, an object distance adjustment driving gear engaged with the left-eye object distance adjustment gear and the right-eye object distance adjustment gear and a driving motor driving the object distance adjustment driving gear to rotate and being capable of moving back and forth on the fixing bracket along a second direction; a pupil distance adjustment mechanism connected to at least one lens barrel, and configured to drive the lens barrel to move in the first direction when an external force is applied, and a linkage member arranged between the at least one lens barrel and the driving motor.

8 Claims, 6 Drawing Sheets

(51) Int. Cl.
*G02C 9/02* (2006.01)
*G06T 19/00* (2011.01)

(52) U.S. Cl.
CPC .... *G06T 19/006* (2013.01); *G02B 2027/0138* (2013.01); *G02B 2027/0178* (2013.01)

(56) References Cited

U.S. PATENT DOCUMENTS

| | | | |
|---|---|---|---|
| 2017/0090145 A1* | 3/2017 | Lin | G02B 27/0176 |
| 2019/0154952 A1* | 5/2019 | Zheng | G02B 7/023 |
| 2019/0302394 A1* | 10/2019 | Zhou | G02B 7/023 |

* cited by examiner

SMART GLASSES INCLUDING OBJECT DISTANCE ADJUSTMENT DRIVING GEAR

CROSS-REFERENCE TO RELATED APPLICATION

The present application claims priority to Chinese Patent Application No. 202010620267.6 filed on Jun. 30, 2020. The entire contents of the above-listed application is hereby incorporated by reference for all purposes.

TECHNICAL FIELD

The present disclosure relates to the field of smart device technology, in particular to smart glasses.

BACKGROUND

A pair of Virtual Reality (VR) glasses is a virtual reality head-mounted display device, and configured to shield a vision and an auditory sensation of a user to the outside, and guide the user to have a feeling of being in a virtual environment. When a pupil distance of the user does not match a distance between center points of a left lens and a right lens of the VR glasses, a discomfort sense may occur to the user. Therefore, the VR glasses usually have a pupil distance adjustment function in order to be suitable for different users. Similarly, in order to match different myopia degrees of users, it is necessary for the VR glasses to have an object distance adjustment function.

In single-lens VR glasses, a screen is usually moved during an object distance adjustment, glasses are merely required to be moved during a pupil distance adjustment, and the object distance adjustment may be realized by using one motor in structure. In contrast, in VR glasses with dual screens and dual lens barrels, it is difficult to achieve the object distance adjustment of the dual lens barrels driven by a single motor during the pupil distance adjustment. Usually, two motors are required to adjust object distances of the left and right lens barrels respectively. However, such problems as an increasing entire power consumption, a reducing battery life and an increasing control cost may occur by providing the two motors.

SUMMARY

The technical solutions in the embodiments of the present disclosure are as follows.

Smart glasses include: a housing; a fixing bracket arranged in the housing; two lens barrels arranged side-by-side on the fixing bracket along a first direction and including a left lens barrel and a right lens barrel; an object distance adjustment mechanism including a left-eye object distance adjustment gear arranged on the left lens barrel, a right-eye object distance adjustment gear arranged on the right lens barrel, an object distance adjustment driving gear engaged with the left-eye object distance adjustment gear and the right-eye object distance adjustment gear and a driving motor driving the object distance adjustment driving gear to rotate and being capable of moving back and forth on the fixing bracket along a second direction crossing the first direction; a pupil distance adjustment mechanism connected to at least one of the left lens barrel and the right lens barrel, and configured to drive the lens barrel connected to the pupil distance adjustment mechanism to move in the first direction when an external force is applied, so as to enable the left lens barrel and the right lens barrel to be close to or far away from each other in the first direction; and a linkage member arranged between the at least one of the left lens barrel and the right lens barrel and the driving motor, and configured to drive the object distance adjustment driving gear to move in the second direction when the left lens barrel and the right lens barrel are close to or far away from each other in the first direction, so as to enable the object distance adjustment driving gear to be engaged with the left-eye object distance adjustment gear and the right-eye object distance adjustment gear.

In a possible embodiment of the present disclosure, the fixing bracket is provided with a first guiding rail extending along the second direction, the first guiding rail is provided with a motor fixing member slidable on the first guiding rail, the driving motor is fixed onto the motor fixing member, and the linkage member is arranged between the motor fixing part and the at least one of the left lens barrel and the right lens barrel.

In a possible embodiment of the present disclosure, the fixing bracket is provided with a second guiding rail extending along the first direction, and the at least one of the left lens barrel and the right lens barrel is capable of moving back and forth along the second guiding rail.

In a possible embodiment of the present disclosure, the second guiding rail includes at least two guiding rods arranged in parallel on the fixing bracket, and the at least one of the left lens barrel and the right lens barrel is provided with sliding blocks or sliding rings slidably arranged on the guiding rods.

In a possible embodiment of the present disclosure, the linkage member includes a linkage lever, a first end of the linkage lever is pivotally connected to the motor fixing member, and a second end of the linkage lever is pivotally connected to the at least one of the left lens barrel and the right lens barrel.

In a possible embodiment of the present disclosure, a pivotal central axis between the first end of the linkage lever and the motor fixing part is coaxial with an axis line of the object distance adjustment driving gear, and a pivotal central axis between the second end of the linkage lever and the left lens barrel as well as the right lens barrel is coaxial with a central axis of the left-eye object distance adjustment gear and the right-eye object distance adjustment gear.

In a possible embodiment of the present disclosure, the motor fixing member includes a ring structure, the driving motor is sleeved in the ring structure, a guiding post is provided on an outer circumferential side of the ring structure, a guiding groove is provided on an inner side of the first guiding rail of the fixing bracket, and the guiding post is arranged in the guiding groove.

In a possible embodiment of the present disclosure, one linkage lever is provided between the motor fixing member and each one of the left lens barrel and the right lens barrel, such that when the left lens barrel and the right lens barrel approach each other, a rotation occurs at a connection position between each lens barrel and the linkage lever, and a relative rotation occurs between the linkage lever and the motor fixing member, the two linkage levers have opposite rotation directions.

In a possible embodiment of the present disclosure, the first end of the linkage lever is provided with a first hinged hole structure sleeved on an outer side of the ring structure and rotatable relative to the ring structure, the second end of the linkage lever is provided with a second hinged hole structure, the at least one of the left lens barrel and the right lens barrel is provided with a connection shaft, and the second hinged hole structure is sleeved on an outer side of the connection shaft and rotatable relative to the ring structure.

In a possible embodiment of the present disclosure, the housing is provided with a sliding opening extending along the first direction, one end of the pupil distance adjustment mechanism is connected to the lens barrel connected to the pupil distance adjustment mechanism, and the other end of the pupil distance adjustment mechanism extends out of the housing through the sliding opening and is slidable in the sliding opening.

In a possible embodiment of the present disclosure, the pupil distance adjustment mechanism includes a supporting column, one end of the supporting column being connected to the lens barrel connected to the pupil distance adjustment mechanism, and the other end of the supporting column extending to the sliding opening; a compression spring sleeved on the supporting column, and a compression spring button sleeved on an outer side of the supporting column and capable of moving back and forth relative to the supporting column in an axial direction of the supporting column. The compression spring button includes a sleeve, a pressing-piece part and a button part, the compression spring is pressed between the pressing-piece part and the lens barrel to press the pressing-piece part against an inner side wall of the housing, the button part is arranged on the sleeve, and located on a side of the pressing-piece part away from the sleeve, and the button portion extends out of the housing through the sliding opening. When the button part is pressed, the pressing-piece part is detached from the housing under the push of the button part, so as to enable the button part to move in the sliding opening. When the button part is released, the pressing-piece part is pressed against the inner side wall of the housing by the compression spring to fix a position of the button part.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Smart glasses are provided in the embodiments of the present disclosure, so as to realize the object distance adjustment of double-lens barrel driven by a single motor while having the pupil distance adjustment function, thereby to reduce a power consumption, improve a battery life, and reduce a cost.

Figure 1:
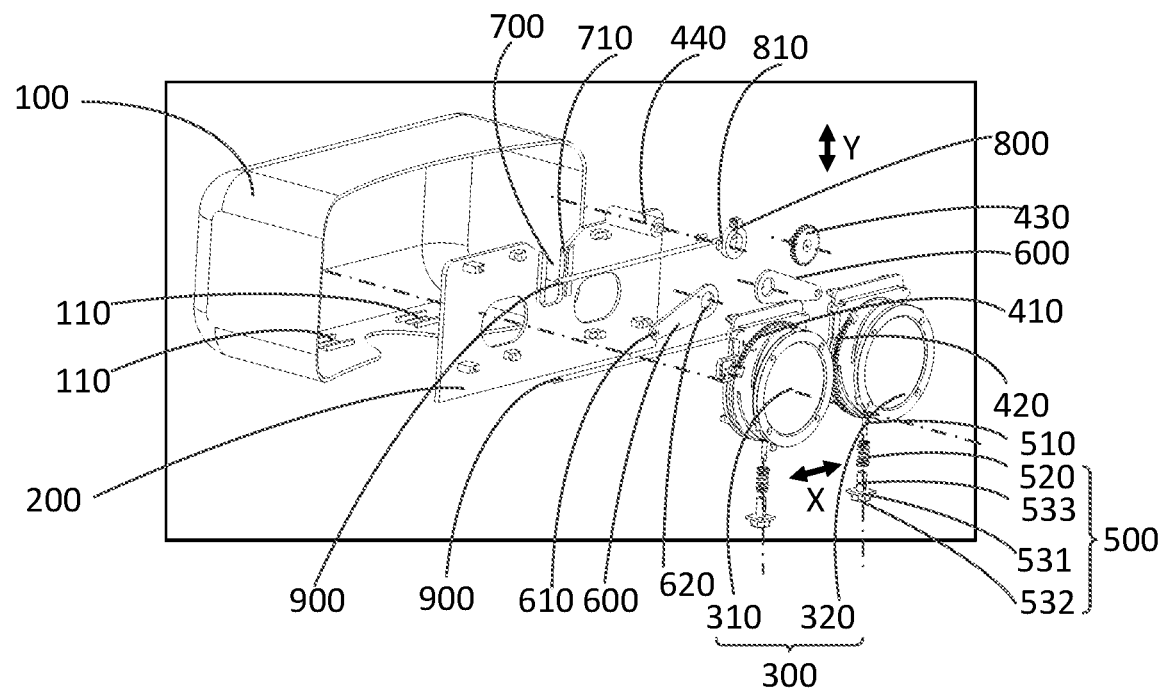
FIG. 1 is an exploded view of smart glasses according to one embodiment of the present disclosure.
Figure 2:
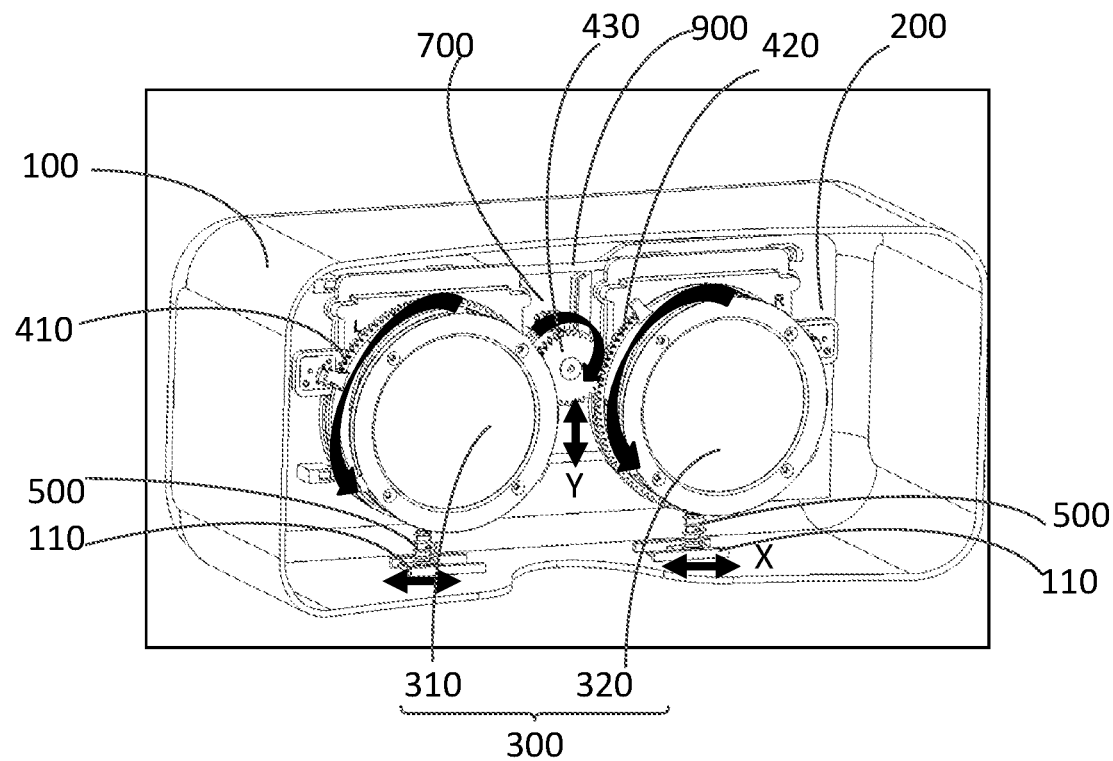
FIG. 2 is a solid view of the smart glasses according to one embodiment of the present disclosure.

As shown in FIG. 1 and FIG. 2, smart glasses are provided in the embodiment of the present disclosure, including: a housing 100; a fixing bracket 200 arranged in the housing 100; two lens barrels 300 arranged side-by-side on the fixing bracket 200 along a first direction X and including a left lens barrel 310 and a right lens barrel 320; an object distance adjustment mechanism including a left-eye object distance adjustment gear 410 arranged on the left lens barrel 310, a right-eye object distance adjustment gear 420 arranged on the right lens barrel 320, an object distance adjustment driving gear 430 engaged with the left-eye object distance adjustment gear 410 and the right-eye object distance adjustment gear 420 and a driving motor 440 driving the object distance adjustment driving gear 430 to rotate and being capable of moving back and forth on the fixing bracket 200 along a second direction Y crossing the first direction X; a pupil distance adjustment mechanism 500 connected to at least one of the left lens barrel 310 and the right lens barrel 320, and configured to drive the lens barrel connected to the pupil distance adjustment mechanism 500 to move in the first direction X when an external force is applied, so as to enable the left lens barrel 310 and the right lens barrel 320 to be close to or far away from each other in the first direction X; and a linkage member 600 arranged between the at least one of the left lens barrel 310 and the right lens barrel 320 and the driving motor 440, and configured to drive the object distance adjustment driving gear 430 to move in the second direction Y when the left lens barrel 310 and the right lens barrel 320 are close to or far away from each other in the first direction X, so as to enable the object distance adjustment driving gear 430 to be engaged with the left-eye object distance adjustment gear 410 and the right-eye object distance adjustment gear 420.

In the smart glasses of the embodiments of the present disclosure, the object distance adjustment driving gear 430 is engaged with the left-eye object distance adjustment gear of the left lens barrel 310 and the right-eye object distance adjustment gear of the right lens barrel 320 simultaneously, and it is able to drive the left-eye object distance adjustment gear of the left lens barrel 310 and the right-eye object distance adjustment gear of the right lens barrel 320 simultaneously with one driving motor 440, so as to realize a synchronous object distance adjustment for both eyes. In addition, when the pupil distance adjustment mechanism 500 is controlled to adjust the pupil distance under an external force (for example, under a manual operation), the left and right lens barrels are driven to move close to or far away from each other in the first direction X by the pupil distance adjustment mechanism 500. At this time, the linkage member 600 connected to the lens barrel performs linkage adjustment to drive the driving motor 440 and the object distance adjustment driving gear 430 to move upward or downward in the second direction Y, so as to ensure that the object distance adjustment driving gear 430 is always engaged with the left-eye object distance adjustment gear 410 and the right-eye object distance adjustment gear 420.

Therefore, in the smart glasses of the embodiments of the present disclosure, through the linkage between the driving motor 440 and the object distance adjustment driving gear 430 in the object distance adjustment mechanism 500 and the pupil distance adjustment mechanism, it is able to achieve the object distance adjustment for double lens barrel with a single motor within a pupil distance adjustment range and achieve the pupil distance adjustment under the manual operation or the external force, thereby to reduce the cost and improve the battery life when meeting the requirement on the overall adjustment function.

It should be appreciated that, in the above embodiment of the present disclosure, when the first direction X crosses the second direction Y, it means that the first direction X and the second direction Y may be perpendicular to each other. For example, the first direction X is a horizontal direction, and the second direction Y is a vertical direction.

It should be further appreciated that, in the embodiment of the present disclosure, when both the left lens barrel 310 and the right lens barrel 320 are movable during the pupil distance adjustment, each lens barrel may be provided with the pupil distance adjustment mechanism 500. When only one lens barrel is movable, only the one lens barrel is provided with the pupil distance adjustment mechanism 500.

In an exemplary embodiment of the present disclosure, as shown in FIGS. 1 to 10, the left lens barrel 310 may have the object distance adjustment function when the left-eye object distance adjustment gear 410 provided on the left lens barrel 310 is rotated. Similarly, the right lens barrel 320 may have the object distance adjustment function when the right-eye object distance adjustment gear 420 provided on the right lens barrel 320 is rotated.

Figure 3:
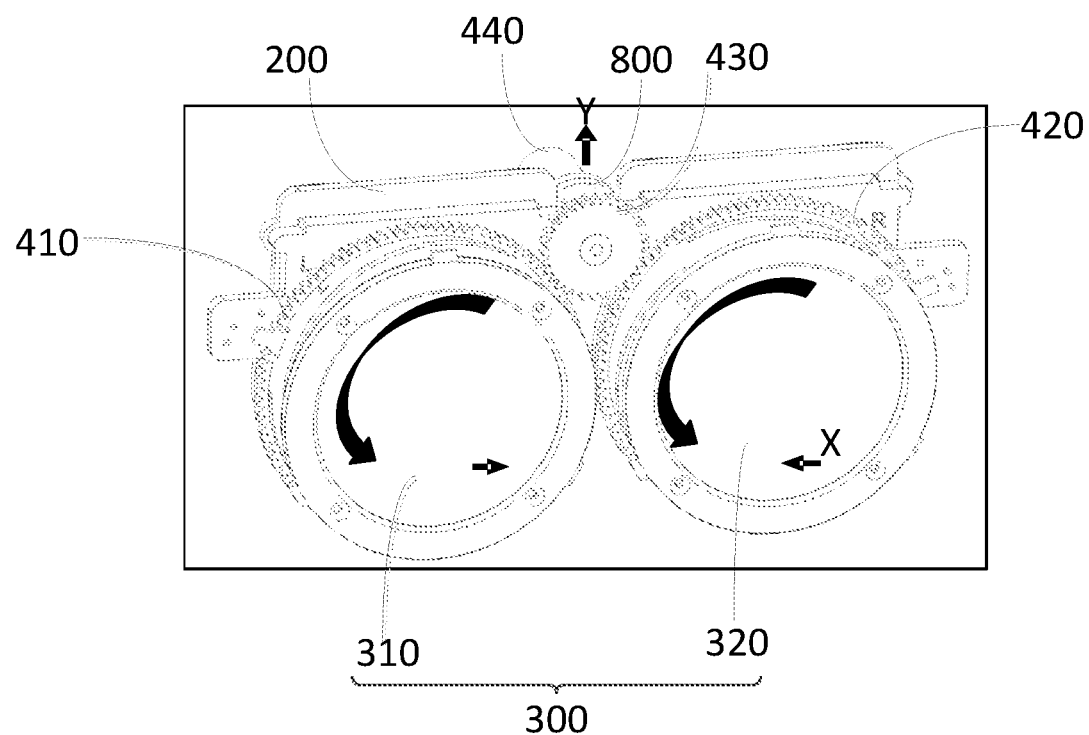
FIG. 3 is a partial structural schematic view of the smart glasses when a left lens barrel and a right lens barrel move close to each other according to one embodiment of the present disclosure.
Figure 4:
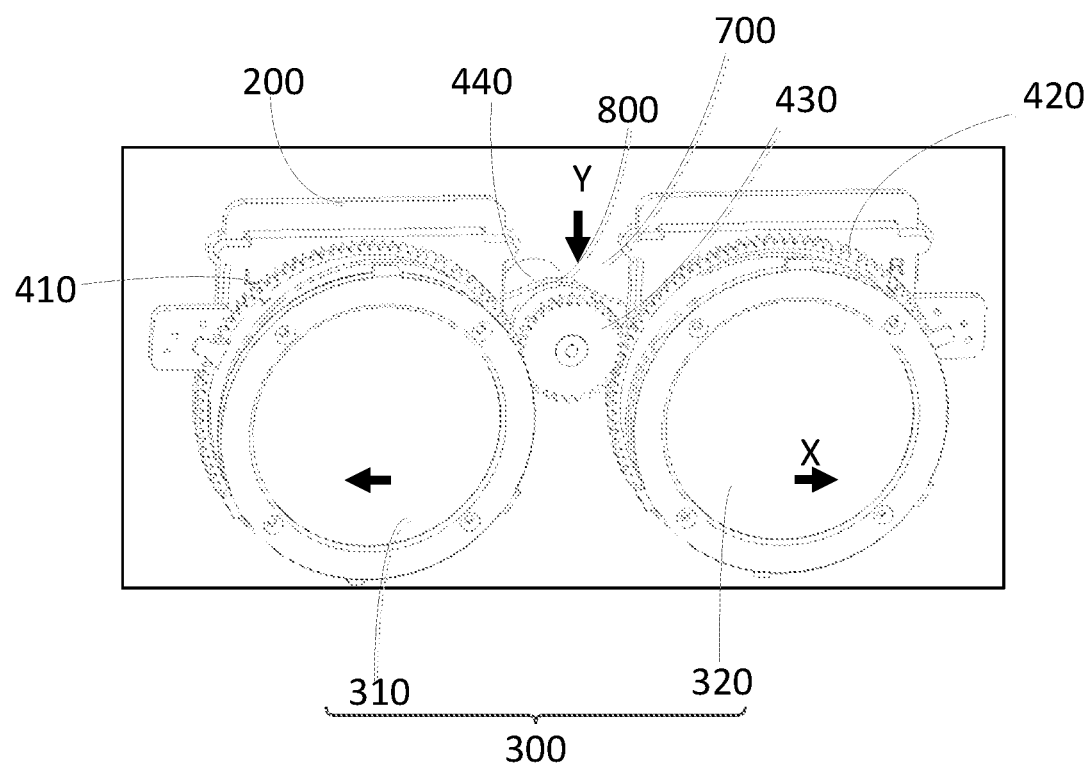
FIG. 4 is a partial structural schematic view of the smart glasses when the left lens barrel and the right lens barrel move far away from each other according to one embodiment of the present disclosure.
Figure 9:
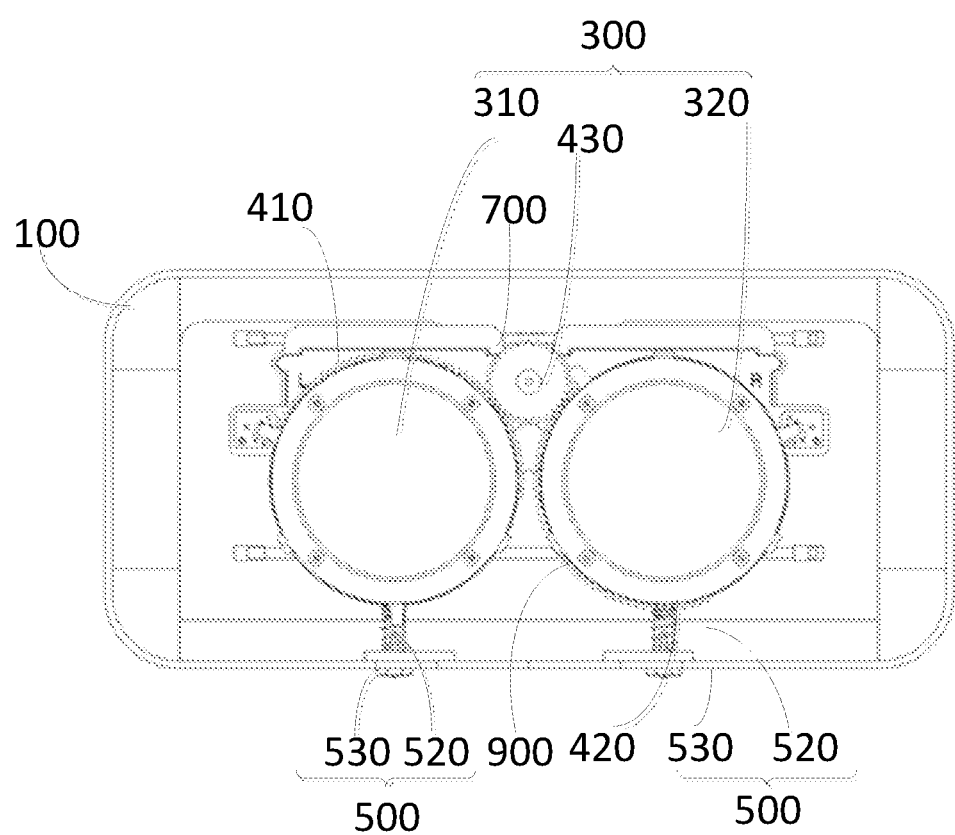
FIG. 9 is a solid view of the smart glasses when the left lens barrel and the right lens barrel move close to each other according to one embodiment of the present disclosure.
Figure 10:
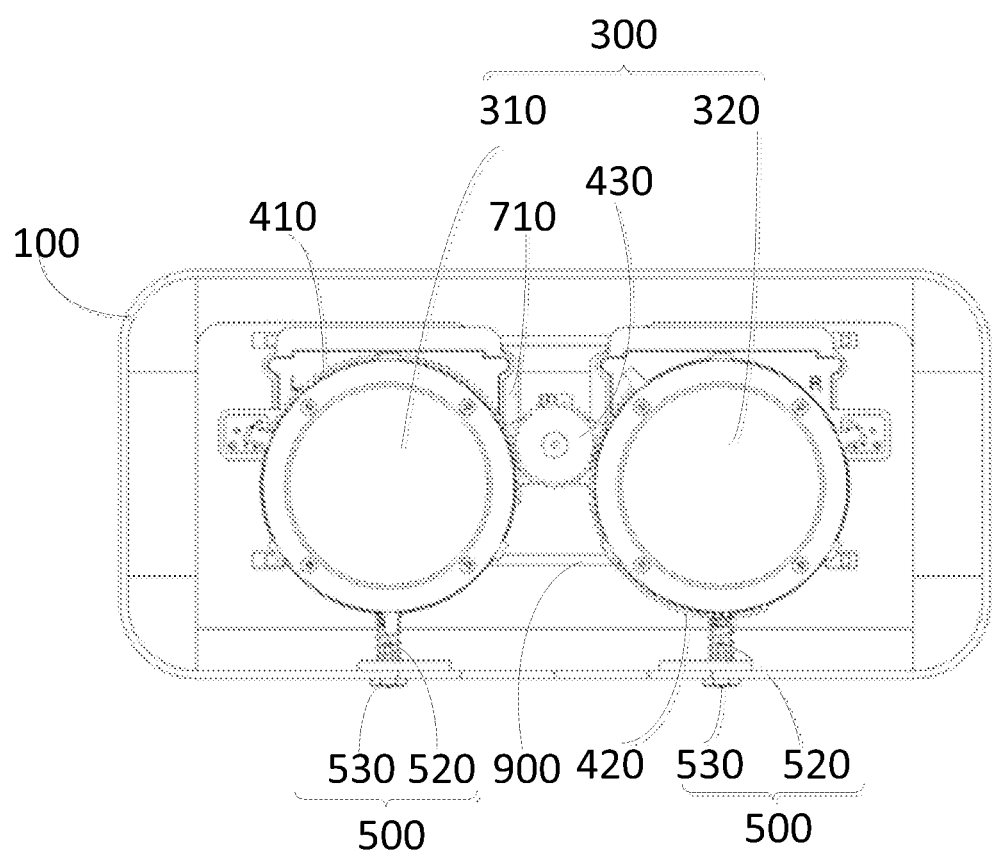
FIG. 10 is a solid view of the smart glasses when the left lens barrel and the right lens barrel move far away from each other according to one embodiment of the present disclosure.

The left-eye object distance adjustment gear 410 and the right-eye object distance adjustment gear 420 are located on two sides of the object distance adjustment driving gear 430 respectively, and a diameter of the object distance adjustment driving gear 430 is larger than a largest distance between the left-eye object distance adjustment gear 410 and the right-eye object distance adjustment gear 420 in the first direction X. In this way, as shown in FIGS. 3 and 9, when the left-eye object distance adjustment gear 410 and the right-eye object distance adjustment gear 420 approach each other along the first direction X, due to the decreasing distance between the left-eye object distance adjustment gear 410 and the right-eye object distance adjustment gear 420 in the first direction X, the object distance adjustment driving gear 430 located between the left-eye object distance adjustment gear 410 and the right-eye object distance adjustment gear 420 may move to a side away from the left-eye object distance adjustment gear 410 and the right-eye object distance adjustment gear 420 in the second direction Y, so as to enable the object distance adjustment driving gear 430 to be always engaged with the left-eye object distance adjustment gear 410 and the right-eye object distance adjustment gear 420. In addition, as shown in FIGS. 4 and 10, when the left-eye object distance adjustment gear 410 and the right-eye object distance adjustment gear 420 move far away from each other along the first direction X, due to the increasing distance between the left-eye object distance adjustment gear 410 and the right-eye object distance adjustment gear 420 in the first direction X, the object distance adjustment driving gear 430 located between the left-eye object distance adjustment gear 410 and the right-eye object distance adjustment gear 420 may move to a side close to the left-eye object distance adjustment gear 410 and the right-eye object distance adjustment gear 420 in the second direction Y, so as to enable the object distance adjustment driving gear 430 to be always engaged with the left-eye object distance adjustment gear 410 and the right-eye object distance adjustment gear 420.

In an exemplary embodiment, as shown in FIGS. 1 and 2, the housing 100 may be of a hood-like shape having an opening at one entire side, and the fixing bracket 200 may be a one-piece bracket, and a shape of an edge of the fixing bracket matches a shape of an internal cavity of the housing 100, so as to be fixed inside the housing 100. The fixing bracket 200 is provided with two mounting holes, and the left lens barrel 310 and the right lens barrel 320 are arranged in the two mounting holes respectively. The fixing bracket 200 is provided with a first guiding rail 700 extending along the second direction Y, the first guide rail 700 is provided with a motor fixing member 800 slidable on the first guiding rail 700, the driving motor 440 is fixed onto the motor fixing member 800, and the linkage member 600 is arranged between the motor fixing part 800 and the at least one of the left lens barrel 310 and the right lens barrel 320.

In the above embodiment of the present disclosure, when the fixing bracket 200 is provided with the first guiding rail 700, and the motor fixing member 800 is provided on the first guiding rail 700, the driving motor 440 and the object distance adjustment driving gear 430 may move back and forth in the second direction Y, and it is able to ensure that the driving motor 440 and the object distance adjustment driving gear 430 to merely move in the second direction Y.

In an exemplary embodiment of the present disclosure, the first guiding rail 700 may be a strip-like notch, hole or slot defined in the fixing bracket 200, and the motor fixing member 800 is provided in the strip-like notch, hole or slot. In this way, it is convenient for the motor to move back and forth. Of course, it should be appreciated that, in practical applications, a specific structure of the first guiding rail 700 is not limited thereto. For example, the first guiding rail 700 may also be a guiding rod arranged on the fixing bracket 200, etc.

In addition, a limiting member may be further provided on the first guiding rail 700 to limit a stroke of the motor fixing member 800. For example, a protrusion is provided on an inner side wall of the first guiding rail 700 as the limiting member.

In an exemplary embodiment of the present disclosure, in order to improve the stability of the driving motor 440 and the object distance adjustment driving gear 430 during movement, as shown in FIG. 1, the motor fixing member 800 includes a ring structure, the driving motor 440 is sleeved in the ring structure, a guiding post 810 is provided on an outer circumferential side of the ring structure, a guiding groove 710 is provided on an inner side of the first guiding rail 700 of the fixing bracket 200, and the guiding post 810 is arranged in the guiding groove 710.

In the above embodiment of the present disclosure, when the motor fixing member 800 is provided with the guiding post 810, and the first guiding rail 700 is provided with the guiding groove 710, it is able to ensure the movement stability during the movement of the motor fixing member 800.

Of course, it should be appreciated that, in practical applications, the motor fixing member 800 and the first guiding rail 700 may also be guided through other guiding structures, so as to improve the motion stability. For example, a motor guiding member is provided with a guiding groove, and a guiding post is provided on the inner side of the first guiding rail 700.

In addition, in an exemplary embodiment of the present disclosure, as shown in FIGS. 1 and 2, the fixing bracket 200 is further provided with a second guiding rail 900 extending along the first direction X, and the at least one of the left lens barrel 310 and the right lens barrel 320 is capable of moving back and forth along the second guiding rail 900.

In the above embodiment of the present disclosure, when the second guiding rail 900 is provided on the fixing bracket 200, it is able to guide the moving lens barrels during the pupil distance adjustment when the left lens barrel 310 and the right lens barrel 320 are moved, so as to improve the movement stability, and ensure the lens barrels to merely move in the first direction X.

Figure 6:
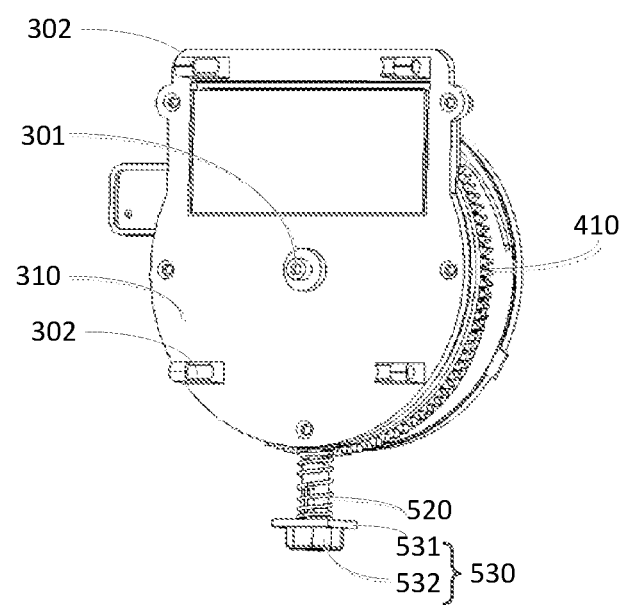
FIG. 6 is a rear view of the left lens barrel of the smart glasses according to one embodiment of the present disclosure.

In addition, in an exemplary embodiment of the present disclosure, as shown in FIG. 6, the second guiding rail 900 includes at least two guiding rods arranged in parallel on the fixing bracket 200, and the at least one of the left lens barrel 310 and the right lens barrel 320 is provided with sliding blocks or sliding rings 302 slidably arranged on the guiding rods.

In the above scheme, through guiding the moving lens barrels, it is able to improve the stability during the movement process. In addition, in the case that the left lens barrel 310 and the right lens barrel 320 are movable during the pupil distance adjustment, the sliding blocks or sliding rings 302 are provided on both the left lens barrel 310 and the right lens barrel 320. In the case that one of the left lens barrel 310 and the right lens barrel 320 is movable during the pupil distance adjustment, the one of the left lens barrel 310 and the right lens barrel 320 is provided with the sliding blocks or sliding rings 302, the other may be fixed on the fixing bracket 200. In addition, a limiting member may be provided on the second guiding rail 900 to limit the stroke of the motor fixing member 800.

In some embodiments of the present disclosure, a specific structure of each of the left lens barrel 310 and the right lens barrel 320 is not particularly defined herein. For example, the specific structure of each of the left lens barrel 310 and the right lens barrel 320 may be that each lens barrel includes a lens barrel body having a cavity and including a front surface and a back surface, the front surface is provided with an opening, a lens is accommodated in the cavity through the opening, a display screen is provided on a side of the lens close to the back surface in the cavity, and a display surface of the display screen faces the lens, so as to display an image for the user. In addition, the sliding blocks or sliding rings are provided on the back surface of the lens barrel, so as to cooperate with the second guiding rail 900 on the fixing bracket 200 to guide the movement of the lens barrels.

In addition, in an exemplary embodiment of the present disclosure, as shown in FIG. 1, the linkage member 600 includes a linkage lever, a first end of the linkage lever is pivotally connected to the motor fixing member 800, and a second end of the linkage lever is pivotally connected to the at least one of the left lens barrel 310 and the right lens barrel 320.

In the above scheme, the linkage member 600 may be realized by the linkage lever. One end of the linkage lever is pivotally connected to the motor fixing member 800, and the other end is pivotally connected to the lens barrel. In some embodiments, two lens barrels may be movable in the first direction X, and one linkage lever is provided between each lens barrel and the motor fixing member. In this way, when the two lens barrels approach each other, a rotation occurs at a connection position between the lens barrel and the linkage lever, and a relative rotation between the linkage lever and the motor fixing member 800 occurs, so as to drive the motor fixing member 800 to move in the second direction Y due to opposite rotation directions of two linkage levers.

In an exemplary embodiment of the present disclosure, a pivotal central axis between the first end of the linkage lever and the motor fixing part 800 is coaxial with an axis line of the object distance adjustment driving gear 430, and a pivotal central axis between the second end of the linkage lever and the left lens barrel 310 as well as the right lens barrel 320 is coaxial with a central axis of the left-eye object distance adjustment gear 410 and the right-eye object distance adjustment gear 420.

In the above scheme, a rotation axis line of one end of the linkage lever connected to the lens barrel is collinear with a rotation axis line of the lens barrel, so as to ensure that the linkage lever merely rotates at the rotation axis line of the lens barrel. Similarly, a rotation axis line of one end of the linkage lever connected to the motor fixing member 800 is collinear with the axis line of the object distance adjustment driving gear 430, so as to ensure that the linkage lever merely rotates at the rotation axis line of the object distance adjustment driving gear 430.

Figure 7:
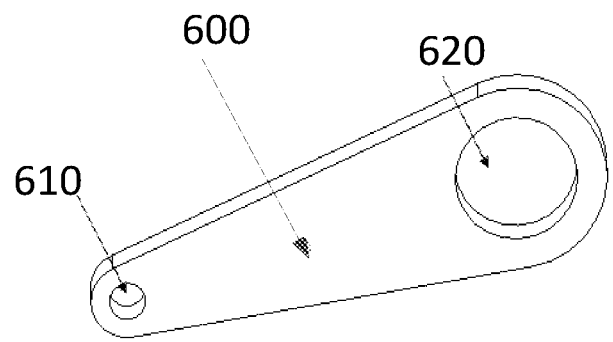
FIG. 7 is a structural schematic view of a linkage lever of the smart glasses according to one embodiment of the present disclosure.
Figure 8:
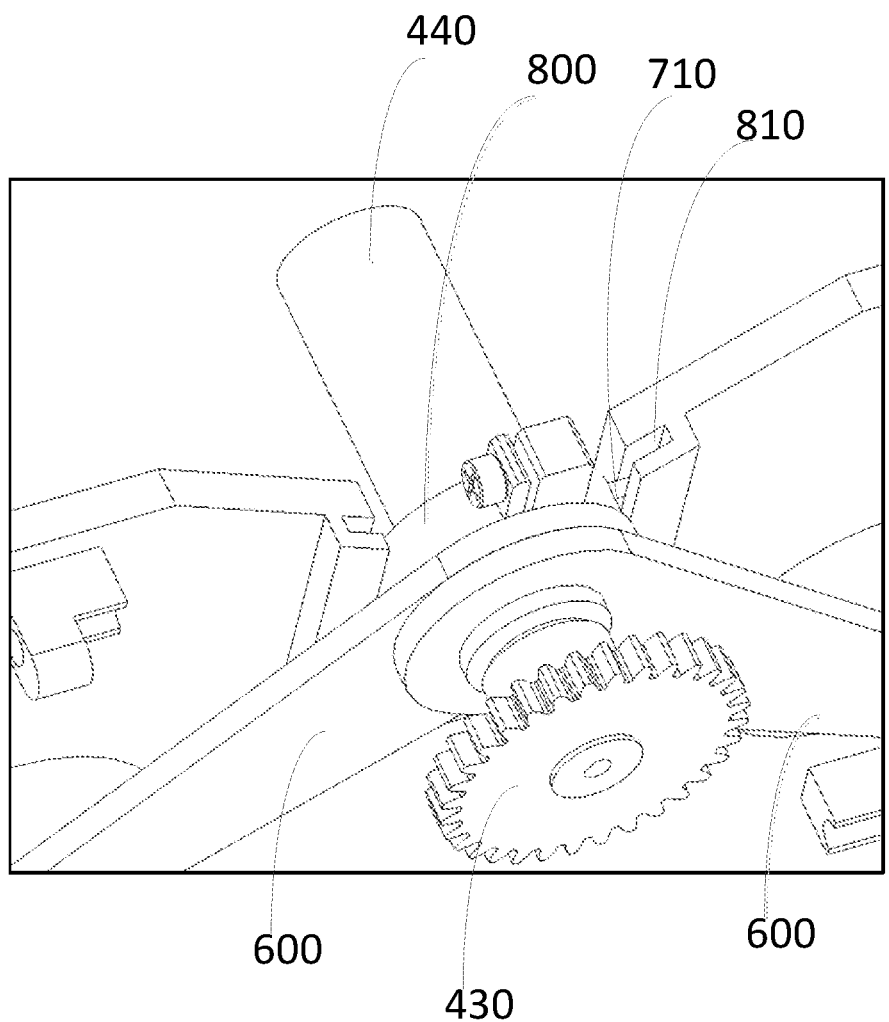
FIG. 8 is a partial structural schematic view of the smart glasses at a driving motor fixing part according to one embodiment of the present disclosure.

In addition, in an exemplary embodiment of the present disclosure, as shown in FIGS. 1 and 7, the first end of the linkage lever is provided with a first hinged hole structure 610 sleeved on an outer side of the ring structure and rotatable relative to the ring structure, the second end of the linkage lever is provided with a second hinged hole structure 620, the at least one of the left lens barrel 310 and the right lens barrel 320 is provided with a connection shaft 301, and the second hinged hole structure is sleeved on an outer side of the connection shaft 301 and rotatable relative to the ring structure.

In the above scheme, the connection shaft 301 may be arranged at the center of the back surface of the lens barrel and pivotally connected to the linkage lever, and such a lubrication structure as a bearing may be provided between the connection shaft and the second hinged hole structure of the linkage lever, so as to achieve a relative rotation between the lens barrel and the linkage lever. The motor driving member is of the ring structure, and a groove may be provided on an outer circumferential surface of the ring structure, the first hinged hole structure at the end of the linkage lever may be sleeved in the groove, and such a lubricating structure as a bearing may be arranged between the groove and the first hinged hole structure, so as to achieve a relative rotation between the motor driving member and the linkage lever.

Of course, it should be appreciated that the above scheme merely is an example of a connection mode between the linkage lever and the motor fixing member 800, and a connection mode between the linkage lever and the lens barrel. In practical applications, the connection mode between the linkage lever and the motor fixing member 800, and the connection mode between the linkage lever and the lens barrel are not limited thereto, as long as it is able to realize the linkage between the motor fixing part 800 and the lens barrel.

In addition, in an exemplary embodiment of the present disclosure, as shown in FIGS. 1 and 2, the housing 100 is provided with a sliding opening 110 extending along the first direction X, one end of the pupil distance adjustment mechanism 500 is connected to the lens barrel connected to the pupil distance adjustment mechanism 500, and the other end of the pupil distance adjustment mechanism extends out of the housing 100 through the sliding opening 110 and slidable in the sliding opening 110.

In the above embodiment of the present disclosure, the sliding opening 110 is provided in the housing 100, and the pupil distance adjustment mechanism 500 extends outward through the sliding opening 110, so that the pupil distance adjustment mechanism 500 may move in the sliding opening 110 through the manual operation, thereby to drive the corresponding lens barrel to move.

Figure 5:
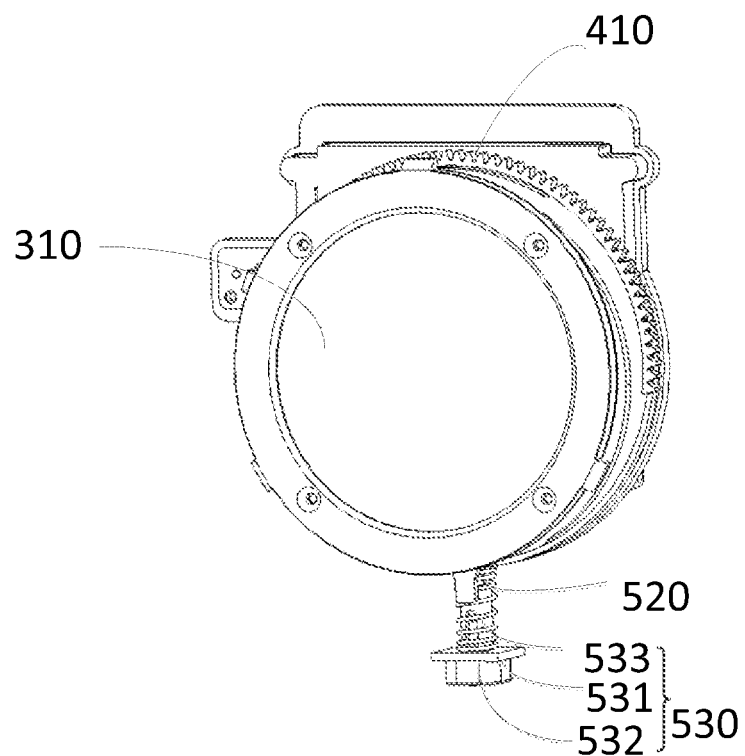
FIG. 5 is a front view of the left lens barrel of the smart glasses according to one embodiment of the present disclosure.

In an exemplary embodiment of the present disclosure, as shown in FIGS. 1, 2 and 5, the pupil distance adjustment mechanism 500 includes a supporting column 510, one end of the supporting column 510 being connected to the lens barrel connected to the pupil distance adjustment mechanism 500, and the other end of the supporting column 510 extending to the sliding opening 110; a compression spring 520 sleeved on the supporting column 510, and a compression spring button 530 sleeved on an outer side of the supporting column 510 and capable of moving back and forth relative to the supporting column 510 in an axial direction of the supporting column 510. The compression spring button 530 includes a sleeve 533, a pressing-piece part 531 and a button part 532, the sleeve 533 is sleeved on the outer side of the support column 510, the compression spring 520 is pressed between the pressing-piece part 531 and the lens barrel to press the pressing-piece part 531 against an inner side wall of the housing 100, the button part 532 is arranged on the sleeve 533, and located on a side of the pressing-piece part 531 away from the sleeve 533, and the button portion 532 extends out of the housing 100 through the sliding opening 110. When the button part 532 is pressed, the pressing-piece part 531 is detached from the housing 100 under the push of the button part 532, so as to enable the button part 532 to move in the sliding opening 110. When the button part 532 is released, the pressing-piece part 531 is pressed against the inner side wall of the housing 100 by the compression spring 520 to fix a position of the button part 532.

In the above scheme, in the case that the pupil distance adjustment is required, the button part 532 is pressed, and then the compression spring button 530 may push the compression spring 520 to move to a side close to the lens barrel relative to the supporting column 510, so as to enable the pressing-piece part to be detached from the inner side wall of the housing 100. At this time, while pressing the button portion 532, the button portion 532 may be manually slid in the first direction X to adjust a position of the lens barrel. In the case that the button portion 532 is slid to a proper position, the pressing-piece part 531 is released and pressed against the housing 100 under a force applied by the compression spring 520, so as to increase a friction force between the housing 100 and the pressing-piece part 531, and ensure that the pupil distance is fixed without an external force.

Of course, it should be appreciated that the specific structure of the pupil distance adjustment mechanism 500 is not limited thereto, as long as the lens barrel may be moved during a manual operation, which will not be particularly defined herein.

The embodiments of the present disclosure described above have the following beneficial effects.

In the smart glasses of the embodiments of the present disclosure, the object distance adjustment driving gear is engaged with the left-eye object distance adjustment gear of the left lens barrel and the right-eye object distance adjustment gear of the right lens barrel simultaneously, and it is able to drive the left-eye object distance adjustment gear of the left lens barrel and the right-eye object distance adjustment gear of the right lens barrel simultaneously with one driving motor, so as to realize a synchronous object distance adjustment for both eyes. In addition, when the pupil distance adjustment mechanism is controlled to adjust the pupil distance under an external force (for example, under a manual operation), the left and right lens barrels are driven to move close to or far away from each other in the first direction by the pupil distance adjustment mechanism. At this time, the linkage member connected to the lens barrel performs linkage adjustment to drive the driving motor and the object distance adjustment driving gear to move upward or downward in the second direction, so as to ensure that the object distance adjustment driving gear is always engaged with the left-eye object distance adjustment gear and the right-eye object distance adjustment gear. Therefore, in the smart glasses of the embodiments of the present disclosure, through the linkage between the driving motor and the object distance adjustment driving gear in the object distance adjustment mechanism and the pupil distance adjustment mechanism, it is able to achieve the object distance adjustment for double lens barrel with a single motor within a pupil distance adjustment range and achieve the pupil distance adjustment under the manual operation or the external force, thereby to reduce the cost and improve the battery life when meeting the requirement on the overall adjustment function.

Some descriptions will be given as follows.

(1) The drawings merely relate to structures involved in the embodiments of the present disclosure, and the other structures may refer to those known in the art.

(2) For clarification, in the drawings for describing the embodiments of the present disclosure, a thickness of a layer or region is zoomed out or in, i.e., these drawings are not provided in accordance with an actual scale. It should be appreciated that, in the case that such an element as layer, film, region or substrate is arranged "on" or "under" another element, it may be directly arranged "on" or "under" the other element, or an intermediate element may be arranged therebetween.

(3) In the case of no conflict, the embodiments of the present disclosure and the features therein may be combined to acquire new embodiments.

The above embodiments are merely for illustrative purposes, but shall not be construed as limiting the scope of the present disclosure. The scope of the present disclosure shall be subject to the scope defined by the appended claims.

What is claimed is:

1. Smart glasses, comprising:
a housing;
a fixing bracket arranged in the housing;
two lens barrels arranged side-by-side on the fixing bracket along a first direction and comprising a left lens barrel and a right lens barrel;
an object distance adjustment mechanism comprising a left-eye object distance adjustment gear arranged on the left lens barrel, a right-eye object distance adjustment gear arranged on the right lens barrel, one object distance adjustment driving gear engaged with both the left-eye object distance adjustment gear and the right-eye object distance adjustment gear simultaneously, and a driving motor driving the object distance adjustment driving gear to rotate and being capable of moving back and forth on the fixing bracket along a second direction crossing the first direction;
a pupil distance adjustment mechanism connected to at least one of the left lens barrel and the right lens barrel, and configured to drive the lens barrel connected to the pupil distance adjustment mechanism to move in the first direction when an external force is applied, so as to enable the left lens barrel and the right lens barrel to be close to or far away from each other in the first direction; and
a linkage member arranged between the at least one of the left lens barrel and the right lens barrel and the driving motor, and configured to drive the object distance adjustment driving gear to move in the second direction when the left lens barrel and the right lens barrel are close to or far away from each other in the first direction, so as to enable the object distance adjustment driving gear to be engaged with the left-eye object distance adjustment gear and the right-eye object distance adjustment gear,
wherein the fixing bracket is provided with a first guiding rail extending along the second direction, the first guiding rail is provided with a motor fixing member slidable on the first guiding rail, the driving motor is fixed onto the motor fixing member, and the linkage member is arranged between the motor fixing member and the at least one of the left lens barrel and the right lens barrel,
wherein the linkage member comprises a linkage lever, a first end of the linkage lever is pivotally connected to the motor fixing member, and a second end of the linkage lever is pivotally connected to the at least one of the left lens barrel and the right lens barrel, and
wherein a pivotal central axis between the first end of the linkage lever and the motor fixing member is coaxial with an axis line of the object distance adjustment driving gear, and a pivotal central axis between the second end of the linkage lever and the left lens barrel as well as the right lens barrel is coaxial with a central axis of the left-eye object distance adjustment gear or the right-eye object distance adjustment gear.

2. The smart glasses according to claim 1, wherein the fixing bracket is provided with a second guiding rail extending along the first direction, and the at least one of the left lens barrel and the right lens barrel is capable of moving back and forth along the second guiding rail.

3. The smart glasses according to claim 2, wherein the second guiding rail comprises at least two guiding rods arranged in parallel on the fixing bracket, and the at least one of the left lens barrel and the right lens barrel is provided with sliding blocks or sliding rings slidably arranged on the guiding rods.

4. The smart glasses according to claim 1, wherein the motor fixing member comprises a ring structure, the driving motor is sleeved in the ring structure, a guiding post is provided on an outer circumferential side of the ring structure, a guiding groove is provided on an inner side of the first guiding rail of the fixing bracket, and the guiding post is arranged in the guiding groove.

5. The smart glasses according to claim 4, wherein the first end of the linkage lever is provided with a first hinged hole structure sleeved on an outer side of the ring structure and rotatable relative to the ring structure, the second end of the linkage lever is provided with a second hinged hole structure, the at least one of the left lens barrel and the right lens barrel is provided with a connection shaft, and the second hinged hole structure is sleeved on an outer side of the connection shaft and rotatable relative to the ring structure.

6. The smart glasses according to claim 1, wherein the housing is provided with a sliding opening extending along the first direction, one end of the pupil distance adjustment mechanism is connected to the lens barrel connected to the pupil distance adjustment mechanism, and the other end of the pupil distance adjustment mechanism extends out of the housing through the sliding opening and is slidable in the sliding opening.

7. The smart glasses according to claim 6, wherein the pupil distance adjustment mechanism comprises a supporting column, one end of the supporting column being connected to the lens barrel connected to the pupil distance adjustment mechanism, and the other end of the supporting column extending to the sliding opening; a compression spring sleeved on the supporting column, and
a compression spring button sleeved on an outer side of the supporting column and capable of moving back and forth relative to the supporting column in an axial direction of the supporting column, wherein the compression spring button comprises a sleeve, a pressing-piece part and a button part, the compression spring is pressed between the pressing-piece part and the lens barrel to press the pressing-piece part against an inner side wall of the housing, the button part is arranged on the sleeve, and located on a side of the pressing-piece part away from the sleeve, and the button portion extends out of the housing through the sliding opening;
wherein when the button part is pressed, the pressing-piece part is detached from the housing under the push of the button part, so as to enable the button part to move in the sliding opening; when the button part is released, the pressing-piece part is pressed against the inner side wall of the housing by the compression spring to fix a position of the button part.

8. The smart glasses according to claim 1, wherein one linkage lever is provided between the motor fixing member and each one of the left lens barrel and the right lens barrel, such that when the left lens barrel and the right lens barrel approach each other, a rotation occurs at a connection position between each lens barrel and the linkage lever, and a relative rotation occurs between the linkage lever and the motor fixing member, the two linkage levers have opposite rotation directions.

\* \* \* \* \*